United States Patent [19]
Yu et al.

[11] Patent Number: 5,435,868
[45] Date of Patent: Jul. 25, 1995

[54] METHOD OF WINDING A FIBER-RESIN COMPOSITE PRESSURE FLUID CYLINDER

[75] Inventors: Xudong Yu, Wauwatosa, Wis.; Carl G. Waldenstrom, Grayslake, Ill.

[73] Assignee: Applied Power Inc., Butler, Wis.

[21] Appl. No.: 112,748

[22] Filed: Aug. 26, 1993

[51] Int. Cl.⁶ ............................................. B65H 81/00
[52] U.S. Cl. ........................................ 156/175; 156/169; 156/173; 156/428; 156/432; 92/171.1
[58] Field of Search ............... 156/169, 171, 172, 173, 156/175, 425, 428, 432; 92/171.1

[56] References Cited

U.S. PATENT DOCUMENTS

| | | | |
|---|---|---|---|
| 2,731,067 | 1/1956 | Miller | 156/190 |
| 2,751,237 | 6/1956 | Conley | 156/171 X |
| 2,878,038 | 3/1959 | Noland | 156/171 |
| 3,040,712 | 6/1962 | Harrah. | |
| 3,200,023 | 8/1965 | Cilker | 156/172 |
| 3,283,050 | 11/1966 | Boggs | 156/432 X |
| 3,673,029 | 6/1972 | McLarty | 156/172 X |
| 3,676,258 | 7/1972 | Jackson | 156/432 |
| 3,703,125 | 11/1972 | Pauliukonis. | |
| 3,736,210 | 5/1973 | Kaczerginski | 156/171 X |
| 3,784,667 | 1/1974 | Drostholm et al. | |
| 3,881,401 | 5/1975 | Bimba. | |
| 4,125,423 | 11/1978 | Goldsworthy | 156/428 |
| 4,189,985 | 2/1980 | Harris. | |
| 4,200,605 | 4/1980 | Imamura et al. | |
| 4,898,082 | 2/1990 | Pottorff. | |
| 4,959,188 | 9/1990 | Leigh-Monstevens. | |
| 4,971,846 | 11/1990 | Lundy. | |
| 5,127,975 | 7/1992 | Zackrisson et al. | 156/172 X |

FOREIGN PATENT DOCUMENTS

| 428808 | 5/1991 | European Pat. Off. | 156/466 |
|---|---|---|---|

OTHER PUBLICATIONS

Applicant's Exhibits A & B —Photographs of fiber-resin composite cylinder, admitted prior art.

*Primary Examiner*—Jeff H. Aftergut
*Attorney, Agent, or Firm*—Quarles & Brady

[57] ABSTRACT

Hydraulic cylinders made of fiber-resin composite materials have a central piston chamber section and bell-shaped internally threaded end sections. Cylinders are made by winding resin coated fibers over a mandril over which externally threaded sleeves are slipped and spaced apart so as to define the end sections. After curing the resin, the winding is cut in the areas of the sleeves to separate the cylinders. An expendable strip is wound onto the sleeves and in the cutting operation is cut into. A bearing, a seal cavity and an enlarged inside diameter at a piston rod end of the cylinder may also be provided using a method of the invention, with the cylinders being cut apart between the ends of sleeves and between the other ends of the cylinders.

10 Claims, 3 Drawing Sheets

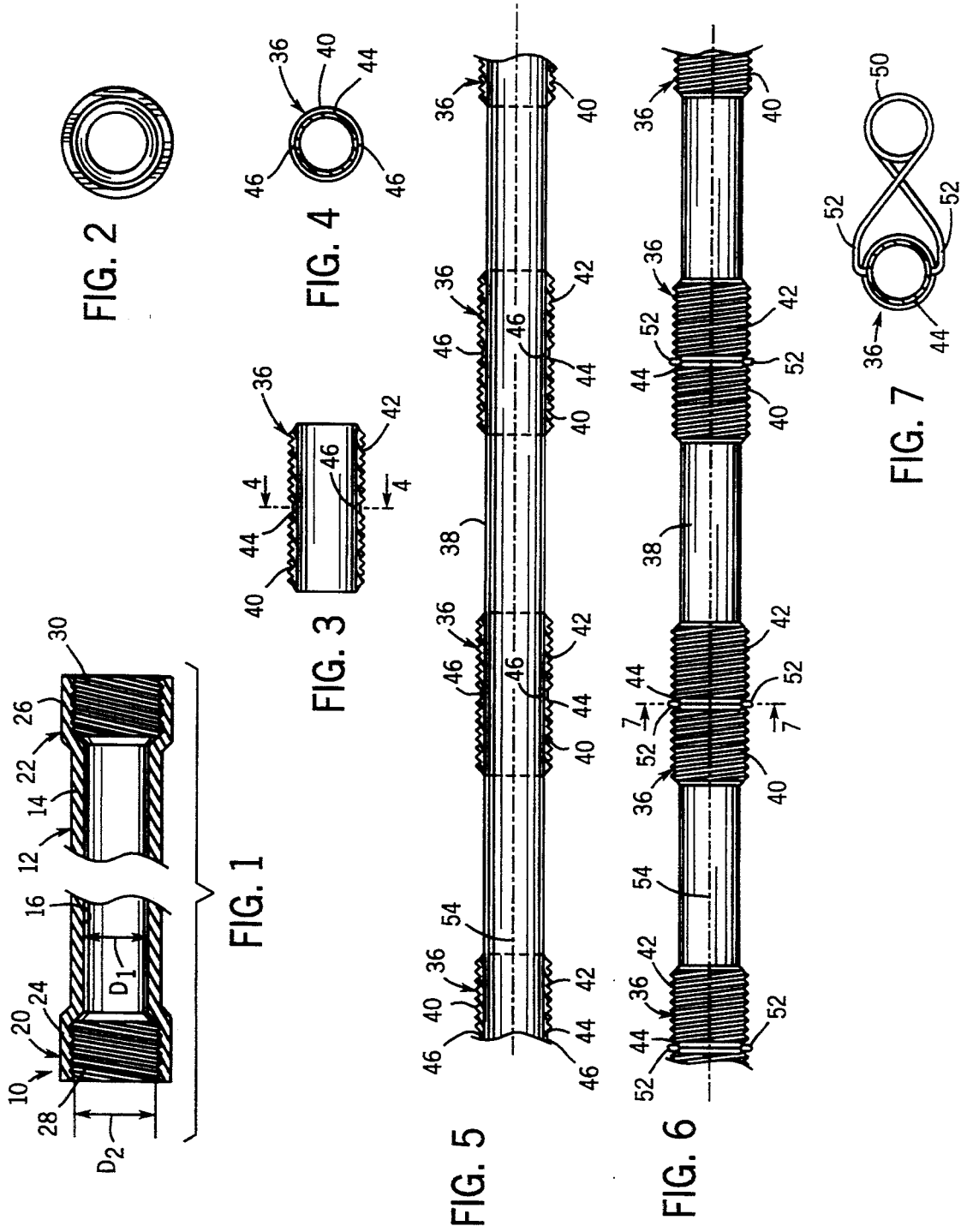

METHOD OF WINDING A FIBER-RESIN COMPOSITE PRESSURE FLUID CYLINDER

FIELD OF THE INVENTION

This invention relates to pressure fluid cylinders of the type used in hydraulic piston-cylinder assemblies which are made of fiber-resin composite materials.

Discussion of the Prior Art

Hydraulic or other pressure fluid cylinders of the type used in piston-cylinder assemblies which are made of fiber-resin composite materials are well known. When such cylinders are made of fiber-resin composite materials, the fibrous component, which is typically a continuous strand or roving of glass fibers, is coated or saturated with a liquid resin and wound onto a turning mandril in helical fashion, with adjacent layers reversed in axial direction, as is well known.

Making hydraulic cylinders of wound fiber-resin materials has many advantages. Fiber-resin composite cylinders compare favorably to metal cylinders in strength, weight, surface finish quality and magnetic properties. Use of fiber-resin composite materials reduces the overall weight of a comparable steel hydraulic cylinder while maintaining hoop and tensile strength. Regarding surface finish quality, steel cylinders, particularly long steel cylinders, cannot be effectively chromed on their interior surfaces toward the middle of the cylinder by practical manufacturing processes so that the surface finish quality on the interior of the cylinder in the middle must sometimes be compromised. Since a mandril can be finished with a uniform highly polished surface, and the finish of the mandril surface is reflected on the interior of a fiber-resin composite cylinder, the interior surface of a fiber-resin composite cylinder can be made to have a uniform highly polished surface finish.

Also, fiber-resin cylinders are non-magnetic so that they can be used in applications which require nonmagnetic materials, such as in magnetic resonance systems in medical applications. Also, the non-magnetic characteristic of the fiber-resin cylinders allows incorporation of magnetically activated position sensors embedded in the cylinder walls. Another advantage in some applications of using fiber-resin composite cylinders over metal cylinders is that a metal cylinder bursts by fracturing, whereas a composite cylinder bursts by delaminating, in a slower rupturing process. In addition, fiber-resin composite cylinders can be molded so as to define a cylinder chamber which is not round, for example one which is egg shaped, so that a similarly shaped piston can be received in the cylinder which will not rotate relative to the cylinder.

Another advantage of using fiber-resin composite materials in hydraulic cylinders is that they are resistant to corrosion, which is advantageous in many environments such as caustic environments or under-sea applications. In connection with this, it is not necessary with a high precision corrosion resistant hydraulic cylinder to use conventional hydraulic oil or any type of oil in the operation of a composite cylinder, but it may be possible in some applications to use water or some other common liquid. This is particularly desirable in medical or other applications where leakage of water from a cylinder would be less objectionable than leakage of oil.

Despite all the advantages of using fiber-resin composite hydraulic cylinders over metal cylinders, the development of fiber-resin composite cylinders has been limited, particularly for high pressure applications. A reason usage of fiber-resin composite cylinders has been limited is that there has been a problem in securing the end caps on the cylinders so that the end caps effectively contain high pressures within the cylinders. End caps have been secured to the cylinders with adhesives, but because of the high pressures demanded of many hydraulic cylinders, the adhesively bonded end caps have proven unsatisfactory, resulting in excessive leakage or bursting, in high pressure applications. Tie rods have also been used to secure the end caps, but this results in a relatively bulky and heavy assembly, and the tie rods can also stretch when the cylinder is subjected to high pressures.

U.S. Pat. Nos. 3,040,712, 3,703,125 and 4,898,082 disclose molded plastic hydraulic cylinders having threaded end caps. In the latter two of these patents the threads are internal to the cylinder, being formed in and having a minor diameter equal to the diameter of the piston bore.

U.S. Pat. No. 3,784,667 discloses a method of winding a fiberglass reinforced pipe onto a mandril and forming a bell-shaped end on the pipe using an annular rubber-bell forming element. The formed bell-shaped end of the pipe is then cut so that the pipe can be removed from the bell forming element. This method is applied to making pipes having bell and spigot ends adapted to be connected together and does not include forming threads in the bell end.

U.S. Pat. No. 3,881,401 discloses a metal hydraulic cylinder having a cap threaded into a bell shaped cylinder end which has a larger diameter than the piston chamber.

U.S. Pat. No. 4,959,188 discloses a plastic hydraulic cylinder with an enlarged end in which an annular retainer 26 is mounted, but not by a threaded connection.

U.S. Pat. No. 4,200,605 contains another disclosure of forming pipes with bell and spigot ends, and U.S. Pat. No. 4,189,985 contains another disclosure of winding a fiberglass resin composite air cylinder. Neither patent discloses forming threads in the pipes or cylinders.

It is also known in the prior art to form a fiber-resin composite cylinder having an internally threaded bell end, which has been used for an electrical fuse holder. Only one end of the cylinder was threaded, and the cylinder was formed one at a time by securing a male thread forming element over the end of the mandril with a temporary connection between the mandril and the thread forming element, and winding the fiber-resin composite over the mandril and thread forming element. After curing, the thread forming element was unscrewed from the cylinder, either before or after the cylinder was removed from the mandril.

SUMMARY OF THE INVENTION

The invention provides a method of making a fiber-resin composite hydraulic cylinder in which a mandril is inserted through a sleeve which has a first end, a second end and external threads on at least one of the ends. At least two cylinders are wound over the mandril and sleeve with one or more layers of fiber and resin to make a winding of multiple cylinders which are integrally joined to one another, the first end defining an end section of one of the cylinders and the second end defining an end section of a different one of the cylinders. The resin is cured after the winding step, the mandril is removed from the winding and sleeve, and the winding is cut in the area intermediate the ends of the sleeve so as to separate the cylinders. The sleeve is then removed from the cylinders including unscrewing the sleeve from at least one of the cylinders. This provides an efficient method of simultaneously winding multiple cylinders having at least one bell shaped internally threaded end which can receive an end cap in a connection which is secure and leak proof to an extremely high pressure. Preferably, several sleeves are spaced apart on the mandril, thereby increasing the number of cylinders being simultaneously wound, to further improve the efficiency of the process.

In a preferred aspect of the method, each sleeve is wrapped with a disposable strip intermediate the ends of the sleeve prior to the step of winding over the mandril and sleeves, and the disposable strip is also wound over. The winding is then cut in the area of the winding confronting the disposable strip and the disposable strip is cut into, thereby signalling the end of the cutting process and providing a clean separation of the cylinders, and the disposable strips are preferably removed from the cylinders. Preferably, each sleeve has an external circumferential groove intermediate its ends and each disposable strip is wound into a corresponding groove.

In an especially preferred aspect, cylinders having a bell-shaped internally threaded end at both ends are provided. This can be accomplished by providing each sleeve with external threads at both the first and second ends thereof.

In one aspect, the method can be performed by inserting the mandril through a quill shaft, and inserting the mandril and quill shaft through the sleeves, with the quill shafts positioned between the mandril and corresponding sleeves. The fiber and resin is then wound over the quill shaft in the area of the mandril covered by the quill shaft, and the quill shaft and mandril is removed from the cylinders after curing the resin. In this aspect, a bearing and seal cavity may also be wound into the cylinder. In addition, the inside diameter of the piston rod end of the cylinder may be enlarged by sliding over the mandril a tube adjacent to the piston rod end of each cylinder, cutting the cylinders apart in the area of the winding confronting the tube and removing the tubes from the cylinders after the cylinders are cut apart.

BRIEF DESCRIPTION OF THE DRAWINGS

FIG. 1 is a longitudinal sectional view of a fiber-resin composite hydraulic cylinder of the invention, shown as being of indeterminate length;

FIG. 2 is an end elevation view of the cylinder of FIG. 1;

FIG. 3 is a longitudinal sectional view of a thread forming insert sleeve used in the process of making a fiber-resin composite cylinder of the invention.

FIG. 4 is a sectional view as viewed from the plane of the line 4—4 of FIG. 3;

FIG. 5 is a view of a section of a cylinder winding mandril with inserts of the type shown in FIG. 3 mounted thereon and shown in section;

FIG. 6 is a view similar to FIG. 5 but with the inserts shown in full and showing a clip for preventing the inserts from turning or sliding relative to the mandril at the early stages of the cylinder winding process;

FIG. 7 is a sectional view taken from the plane of the line 7—7 of FIG. 6 showing the insert and mandril in section and the spring clip in full;

DETAILED DESCRIPTION OF THE PREFERRED EMBODIMENTS

Figure 8:
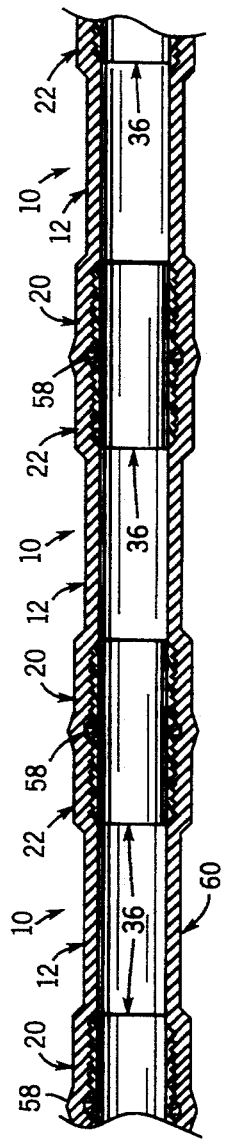
FIG. 8 is a sectional view showing the cylinder multipart winding removed from the mandril and prior to cutting the multi-part winding apart into individual cylinders.

FIGS. 1 and 2 illustrate a fiber-resin composite cylinder 10 of the invention. The cylinder 10 has a central piston chamber section 12 having a wall 14 which defines an interior lumen 16 of a certain diameter $D_1$ for receiving a hydraulic piston with a sliding seal between the lumen 16 and the piston (not shown). Such pistons are well known and any suitable piston capable of forming a sliding seal with the lumen 16 may be used in practicing the present invention.

The cylinder 10 also has opposed end sections 20 and which are integral with and at opposite ends of the piston chamber section 12. Each end section 20, 22 is defined by a respective wall 24, 26, each of which defines a cylindrical lumen 28, 30, respectively. Each lumen 28, 30 has an inside or minor diameter $D_2$, which is the same for each of the lumens 28, 30, although it need not be the same from end to end.

The interior surface of each lumen 28, 30 is defined by female threads adapted for receiving an externally threaded end cap (not shown) in threaded engagement. The end cap may be simply a threaded plug for sealing one end of the cylinder 10 (and may provide a porting configuration, See FIG. 16) or may be a threaded plug with a central hole for receiving a piston rod in sliding engagement (see for example, U.S. Pat. No. 3,703,125).

Since each end section 20, 22 is internally threaded, the diameter $D_2$ is actually the minor diameter of the threads, which is the diameter defined between the inner points or peaks of the threads. The major diameter of the threads is represented in FIGS. 1 and 2 by the diametral distance between the outer points or valleys of the threads. The increased circumference of mating threads allows inserting a piston into the lumen 16 without damaging seals of the piston.

The process of winding fiber rovings which are coated or saturated with thermosetting resin to make fiber-resin composite hydraulic cylinders is well known. The particular fiber and resin materials used in winding a cylinder 10 of the invention form no part of the present invention. Typically, however, the resin used for producing a cylinder of the invention would be a thermo-setting epoxy resin, for example with an anhydride curing agent, and the fibers used would be glass fiber rovings, for example 250 yield (i.e., 250 yds./lb.). However, it should be understood that the invention could be practiced using other types of resins and other types of reinforcing fibers.

Referring to FIGS. 1 and 3–7, the enlarged diameter $D_2$ at the ends of the cylinder 10 is formed by using sleeves 36. Each sleeve 36 is tubular of an inside diameter sized just slightly larger than the outer diameter of a winding mandril 38 over which the cylinder 10 is wound so that the mandril 38 can be inserted into the sleeves 36, with the sleeves 36 spaced apart on the mandril 38. Each sleeve 36 has a first end 40 and a second end 42, the ends 40 and 42 being integral with one another and joined in the middle of sleeve 36. The first and second ends 40 and 42 in the embodiment illustrated define external threads of the same size, direction and pitch as is desired to be formed in the end sections 20 and 22 of the cylinder 10, the end 40 forming the threads in an end section 22 of one adjacent cylinder, and the end 42 forming the threads in the end section 20 of another, adjacent cylinder. However, as stated above, the threads formed by the ends 40 and 42 could be different from one another.

The central section 44 of each sleeve 36 is not threaded and defines an annular groove around the circumference of the sleeve 36. Diametrically opposed holes 46 are formed in the central section 44 which serve to enable holding the sleeve 36 to the mandril 38 as the mandril 38 is rotated and aid in removal of the sleeve 36 from the finished cylinder 10, as further described below.

The sleeve 36 may be made of any suitable material such as a heat resistant plastic, for example Torlon TM which is available from Amoco Oil Company, or of soft brass. The sleeves 36 must be able to maintain structural integrity at temperatures over 400° F. (or whatever is the highest temperature used in the production processing of the cylinders 10) and be made of a relatively soft material so as not to scratch the highly polished surface of the mandril 38.

As mentioned above, fiber-resin winding processes for making hydraulic cylinders as well as other tubular parts are well known and form no part of the present invention except as otherwise specifically discussed herein. Any such process capable of forming a cylinder with larger diameter ends can be used for practicing the present invention. Such winding processes are well known and practiced by many companies in the industry, for example Janco Products, Inc. of Mishawaka, Indiana.

For efficiency in the manufacturing process, it is preferred to use a mandril 38 of a length sufficient to wind multiple cylinders 10 of the invention simultaneously. Thus, the first step in winding cylinders of the invention is to insert the mandril 38 through multiple sleeves 36 and space the sleeves 36 apart on the mandril 38 so as to define between the adjacent sleeves the desired length of piston chamber section 12. To secure the axial positions of the sleeves 36 on the mandril 38 and secure the sleeves 36 to the mandril 38 so that they rotate with the mandril 38 when the mandril 38 is rotated, a spring clamp 50 is used which has legs 52 with ends that fit into the holes 46 to bear on the mandril 38. Preferably, the ends of the legs 52 are rubber coated or a paper shim is placed between the ends and the mandril 38 so as to prevent scratching the mandril 38 with the spring clamp 50.

After the sleeves 36 are positioned and temporarily secured to the mandril 38 by the clamps 50, the mandril 38 is turned about its axis 54 and a release agent is sprayed or otherwise appropriately applied on the exterior surfaces of the mandril and the sleeves 36. Such release agents are well known in the industry. One common release agent is a silicone type agent and another is a flourocarbon type agent. The release agent is applied in a thin coating and functions to allow easy separation of the multi-part winding 60 from the mandril 38 and sleeves 36 after it is wound and cured.

After the release agent is applied, a resin gel coat is applied to the exterior surfaces of the spinning mandril and sleeves 36 to a nominal thickness of, for example, 0.000015" (15 microinches). Such gel coats are also well known in the industry. The purpose of applying the gel coat is to form a resin rich surface at the inner surface of the lumen 16 which will conform to the surface of the mandril 38 so as to provide an interior surface in the lumen 16 which is of a very highly polished finish, for example of an 8–12 microinch finish (rms).

After the gel coat layer is applied to the exterior surfaces of the mandril 38 and sleeves 36, the cylinders 10 are ready to be wound over the gel coat layer. After the gel coat layer is sufficiently cured, the clamps 50 can be removed and the sleeves 36 are sufficiently secured to the mandril 38 by the gel coat layer. At this point, a paper strip 58 (FIG. 8) is wound into the groove which defines the central section 44 and the resin coated fibers are wound over the paper strip as well as over the sleeves 36 and the mandril 38. Should the gel coat layer not be sufficient to hold the sleeves 36 to the spinning mandril, the clamps 50 can remain in place until the rovings have been partially wound over each sleeve, the clamps being removed just prior to them being wound over.

It should be noted that any procedure which results in a highly polished piston chamber surface may be used to practice the present invention. For example, rather than apply a gel coat as the first layer, a surface veil could be wrapped around the mandril and sleeves, which would pool the resin applied in the winding process, described below, adjacent to the mandril and sleeves to create a resin rich surface in the piston chamber, as desired. If such a veil were used, the paper strips 58 could be wound into the grooves which define the central section 44 prior to winding the veil over the mandril and sleeves, and the veil or other suitable means could be used to secure the sleeves 36 in place on the mandril while the rovings are being wound. Note that an o-ring or other similar means could be used in the interior of each sleeve 36 to create a soft interference between each sleeve 36 and the mandril 38 so as to secure the position of each sleeve 36 on the mandril while allowing each sleeve 36 to be slid onto the mandril 38 without damaging the surface finish of the mandril 38.

As indicated above, any suitable fiber-resin winding process may be used. Most commonly a computer controlled composite winding machine will be employed. In connection with the winding process, a helix angle of 85°–90° may be used to maximize hoop strength and a helix angle of 50°–80° combined with the 85°–90° angle to result in a pressure vessel with a desirable ratio of hoop strength to tensile strength. Thus, some of the fiber layers may be wound at an 85°–90° angle and others of the layers wound at a 50°–80° helix angle. This can be done in an alternating fashion, with the fiber layers wound in one axial direction at 50°–80° and the fiber layers wound in the other direction at 85°–90°, or any variation on this.

However, it should be understood that any winding process may be employed to wind cylinders of the invention. Therefore, for example, it may be desirable to use a helix angle of 90° to wind the cylinder in the area of the threads, for increased hoop strength, and an angle of 60–70 degrees in the piston chamber section (between the sleeves 36). Thus, any desired helix angles or combinations of helix angles may be used in practicing the present invention.

The fiber layers are built up to any desired thickness, depending upon the strength of the cylinder desired. In typical application, 20 passes may be used, but any number could be used depending on the application of the cylinder. After the layers are built up as shown in FIG. 8, the resin is cured to a rigid state, typically by holding it at an elevated temperature for a period of time (e.g., 450° F. for 8 hours) and the mandril 38 is pulled out from the product of the process, referred to herein as multi-part winding 60, which is aided by the initial application of the release agent as described above. The multi-part winding 60 is shown in FIG. 8 and consists of a series of integrally connected cylinders 10 with molded-in sleeves 36 and paper strips 58. Although it could be wound to any length and number of cylinders, typically the multi-part winding 60 may be wound to a length of approximately six feet (for a 1½ inch diameter mandril) thereby forming up to six to twenty or more cylinders 10, depending upon the length of the cylinders 10. The length is dependent on the ability of the mandril to support itself and the winding 60, and therefore a larger diameter mandril could be made longer and possibly tubular.

The next step in the processing is to cut away the fiber-resin composite in the area radially outward of the central section 44 down to the paper strip 58. Cutting into the strip 58 signals that the cylinders 10 have been cut apart.

Figure 9:
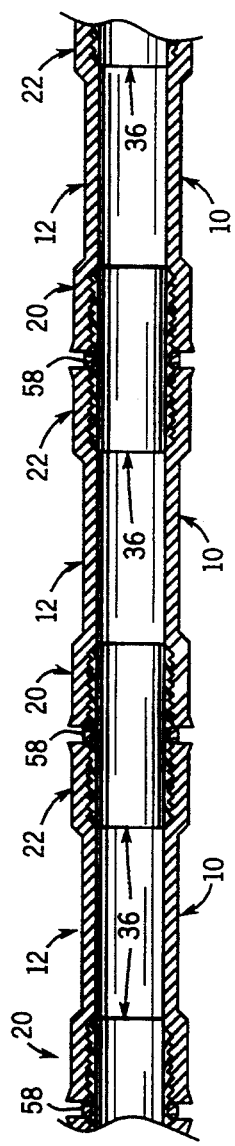
FIG. 9 is a view similar to FIG. 8 but showing the multi-part winding after the individual cylinders are cut apart.
Figure 10:
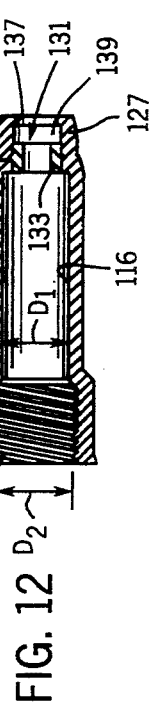
FIG. 10 is a sectional view of one of the cylinders shown with the adjacent cylinders unscrewed from it and shown with one thread forming insert engaged at its left end.
Figure 11:
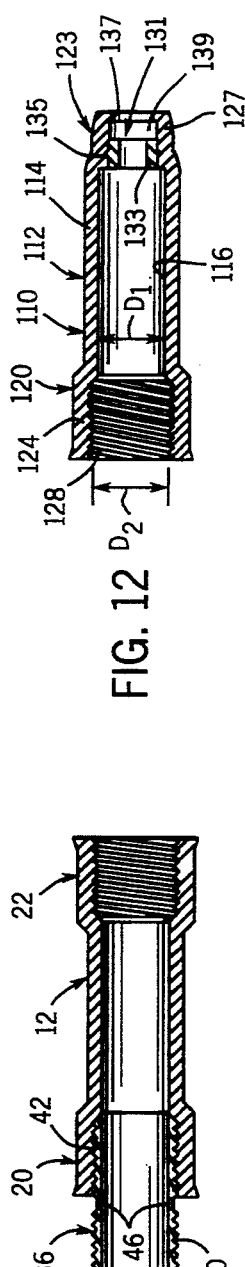
FIG. 11 is a sectional view showing the cylinder of FIG. 10 with the thread forming insert removed and a tool for unscrewing the thread forming insert from the cylinder.

After the cylinders 10 have been cut apart as shown in FIG. 9, they are unscrewed from one another. This process usually results in one of two adjacent cylinders 10 breaking free from its molded-in sleeve 36 so that it can be unscrewed therefrom and the sleeve 36 remaining molded into the adjacent cylinder 10. To remove the remaining sleeve 36 from the cylinder 10, shown in FIG. 10, a shaft (FIG. 11) 56 may be inserted through the holes 46 of the sleeve 36 so as to allow grasping the sleeve 36 and turning it out of the cylinder 10, as shown in FIG. 11. The result is a cylinder 10 with two internally threaded ends of a larger diameter than its piston chamber section as shown in FIGS. 11 and 1 and 2.

Figure 12:
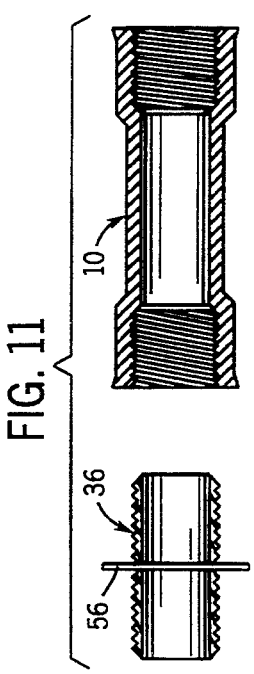
FIG. 12 illustrates a second embodiment of a cylinder of the invention.

FIG. 12 illustrates a second embodiment of a cylinder 110 made according to a method of the invention. In the cylinder 110, elements corresponding to elements of the cylinder 10 are designated with the same reference number plus 100.

As shown, the cylinder 110 differs from the cylinder 10 in that whereas both ends are threaded in the cylinder 10, only one end is threaded in the cylinder 110. Rather than being threaded, the right end section 123, which is defined by wall 127, defines a lumen 131 in which a bearing 133 made of a lubricious material, such as Teflon ™, is received. The bearing 133 has a circumferential rib 135 which is embedded in the wall 127 so that the bearing 133 is axially captured in the lumen 131. The lumen 131 also defines between the bearing 133 and an end flange 137 a seal cavity 137 into which may be received an annular seal 159 (FIG. 16) which forms an axially sliding seal with a piston rod 153 which extends through the bearing 133 and through the annular seal 159. The end flange 137 is larger in internal diameter than is the bearing 133 so as not to interfere with sliding of the piston rod 153.

Figure 13:
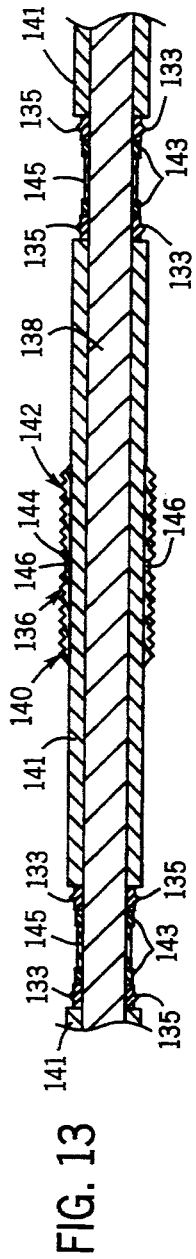
FIG. 13 illustrates a mandril set-up for making the cylinder of FIG. 12.
Figure 14:
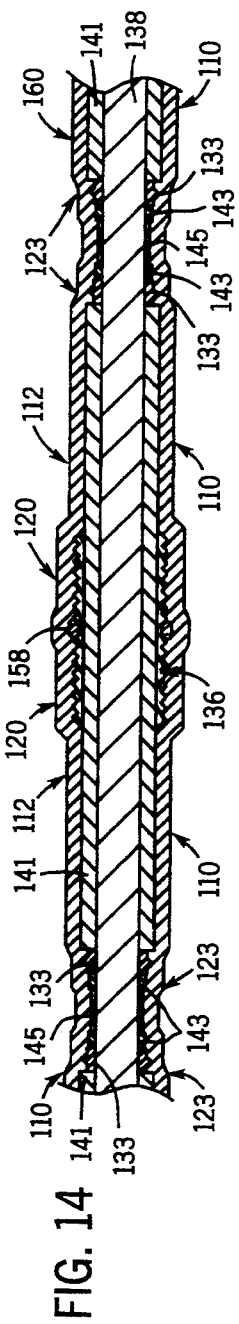
FIG. 14 illustrates the mandril set-up of FIG. 13 with a multi-cylinder winding thereon.
Figure 15:
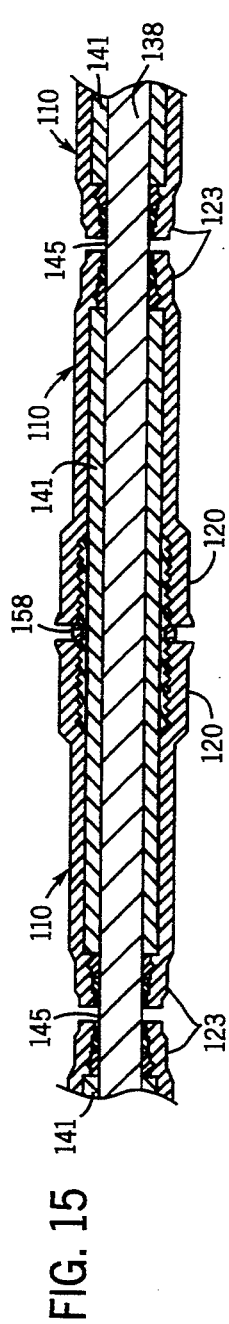
FIG. 15 is a view similar to FIG. 14 but with the cylinders cut apart.

Multiple cylinders 110 are formed on a single mandril 138 using the process illustrated in FIGS. 13–15. FIG. 13 illustrates the mandril assembly prior to winding. The mandril 138 is first inserted through spaced apart quill shafts 141. Each quill shaft 141 is spaced apart from the next adjacent shaft 141 by a bearing 133 at each end 123, a seal gland 143 inward from each bearing 133, and a tube 145 between the seal glands 143. Each seal gland 143 is preferably made of wax or some other material which may be easily removed from the seal cavity 139 after the cylinder 110 is hardened. Each tube 145 is preferably made of an expendable material, such as paper or plastic, which may be cut into when cutting the cylinders 110 apart and removed from the end flanges 137.

The sleeves 136 are slipped over the quill shafts 141, each sleeve 136 being in the center of each quill shaft 141. It should be noted that each sleeve 136 could be made integral with its corresponding quill shaft 141. With the separate sleeves 136 as shown, they are held to rotate with the quill shafts 141 in processing as described above in connection with the spring clamps 50, and the quill shafts 141 are held to rotate with the mandril 138 by a slight axial compressive force being exerted upon them since the assembly of the quill shafts 141, bearings 133, seal glands 143 and tubes 145 is axially continuous.

A release agent is first applied to the assembly shown in FIG. 13, then a resin gel coat, and then the layers of resin and fiber are built up, as described in connection with the cylinder 10. Also, note that prior to applying the resin gel coat or prior to the winding process as discussed above, a strip 158 of paper or other expendable material is wound into the central section 144 of each sleeve 136.

After the winding and curing of the multi-cylinder winding shown in FIG. 14, individual cylinders 110 are separated by cutting them apart in the areas of the strips 158 and tubes 145. Similar to the cutting process for the cylinders 10, the cutting can be through the walls of the cylinders 110 and into the respective strips 158 and tubes 145. As shown in FIG. 15, the cutting process for the cylinders 110 may be performed with the mandril 138 inserted through the cylinders 110, to help provide support for the multi-part cylinder assembly, especially in the area between the ends 123 of adjacent cylinders, if necessary, but may also be performed with the mandril 138 removed. If left inserted, the mandril 138 should not be cut when the cylinders are cut apart so that it may be reused.

After the cutting process, each pair of cylinders connected by the sleeves 136 is removed from the mandril 138 and separated from one another by unscrewing them from the sleeves 136 as described in connection with the cylinder 10. The quill shafts 138 are also removed from the cylinders 110 as are the tubes 145 and the seal glands 143. If the seal glands 143 are made of wax, they can be heated to above their melting point so that they flow out of the seal cavities 139. The cylinders may be further processed, for example by cutting or grinding off the enlarged external diameter at the ends 120, as has been done in the cylinder 110 illustrated in FIG. 12.

Figure 16:
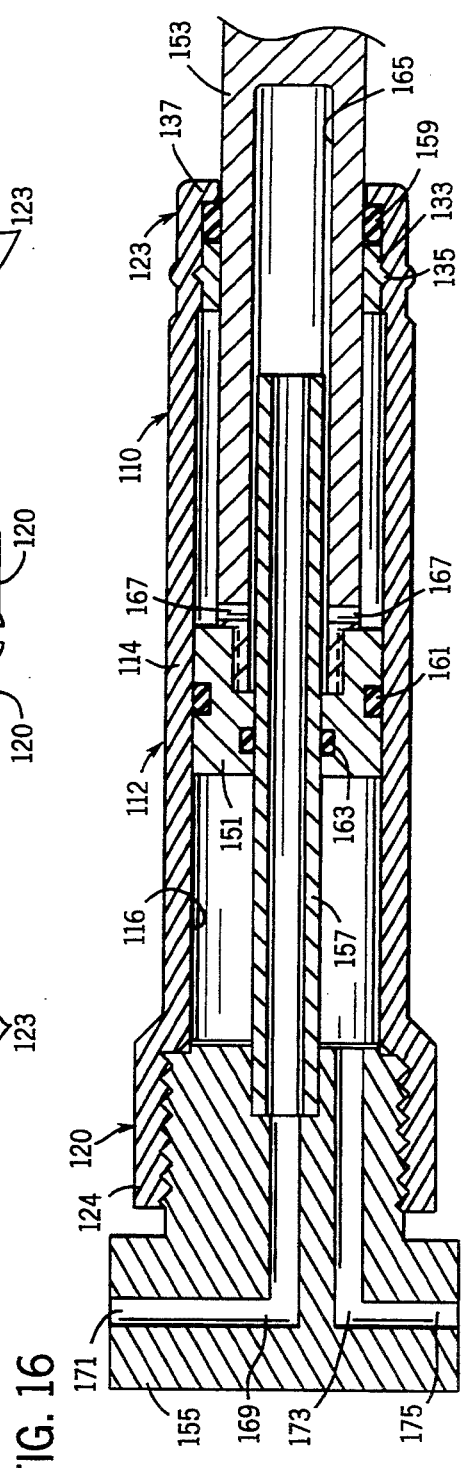
FIG. 16 is a partial sectional view of a cap, porting and piston arrangement for the cylinder of FIG. 12.

FIG. 16 illustrates a porting configuration for the cylinder 110. In FIG. 16, the cylinder 110 is fitted with a piston 151, a piston rod 153 threaded into the piston 151, a cap 155 threaded into end section 120 and a standpipe 157 threaded into the inner end of the cap 155. The piston rod 153 extends through the bearing 133 and through the seal 159. The piston 151 has a sliding seal 161 which forms a sliding seal between the piston 151 and the lumen 116 and a sliding seal 163 which forms a sliding seal between the piston 151 and the standpipe 157. The standpipe 157 extends into an interior cavity 165 in the piston rod 153 and the cavity 165 is in communication with the lumen 116 via passageways 167.

A passageway 169 provides communication between the interior of the standpipe 157 and a port 171 in the cap 155 and a passageway 173 provides communication between port 175 in cap 155 and the lumen 116 on the extension side of the piston 151. Therefore, if it is desired to extend piston rod 153, pressure fluid is admitted through port 175 and passageway 173 into the blind side of lumen 116 and fluid is exhausted from the rod side of lumen 116 through passageways 167, cavity 165, standpipe 157, passageway 169 and port 171. If it is desired to retract piston rod 153, pressure fluid is admitted through port 171 to the rod side and exhausted through port 175 from the blind side so that flow is reversed from the flow described for extending piston rod 153.

A cylinder similar to the cylinder 110 could be made for a single acting cylinder by deleting from the manufacturing process the seal glands 143, and instead abutting the bearings 133 with the tubes 145 on the mandril 138. This would produce a cylinder in which the end 123 was vented, as would be necessary in a single acting cylinder.

Preferred embodiments of the invention have been described in considerable detail. Many modifications and variations will be apparent to the preferred embodiments described which will still incorporate the spirit and scope of the invention. For example, the lumen of the piston chamber section need not necessarily be made round cylindrical but could be made oval, or square or square with rounded corners, which may be desirable in order to arrest rotation of the piston relative to the cylinder. Therefore, the invention should not be limited to the embodiments described or illustrated, but should be defined by the claims which follow.

We claim:

1. A method of making a hollow tubular fiber-resin composite pressure fluid cylinder, comprising;
    inserting a mandril through a unitary tubular sleeve, said sleeve having a first end and a second end and external threads on each of said ends;
    winding over said mandril and both ends of said sleeve a number of layers of fiber and resin to make a winding of at least two cylinders which are integrally joined to one another, said first end defining a threaded end section of one of said cylinders and said second end defining a threaded end section of a different one of said cylinders;
    curing said resin after said winding step;
    removing said mandril from said winding and said sleeve;
    cutting said winding in the area intermediate the ends of said sleeve so as to separate said cylinders between said ends; and
    removing said sleeve from said cylinders including the step of unscrewing said sleeve from both said cylinders.

2. A method as claimed in claim 1, further comprising the step of wrapping each said sleeve with a strip intermediate the ends of said sleeve prior to the step of winding over said mandril and said sleeves, and said step of winding over said mandril and said sleeves further includes winding over said strip, and wherein the step of cutting said winding is performed in the area of said winding confronting said strip and includes cutting into said strip.

3. A method as claimed in claim 2, further comprising the step of removing said strips from said cylinders.

4. A method as claimed in claim 2, wherein each said sleeve has an external circumferential groove intermediate its ends and each said strip is wound into a corresponding groove.

5. A method as claimed in claim 1, wherein an unthreaded section separates the threads at the first end from the threads at the second end.

6. A method as claimed in claim 1, wherein said mandril is inserted through at least two of said sleeves, said sleeves being spaced apart from one another along said mandril, and said winding, curing, cutting and removing steps are applied to both said sleeves.

7. A method of making a fiber-resin composite pressure fluid cylinder, comprising;
    inserting a mandril through a quill shaft;
    inserting said mandril through a sleeve, said sleeve having a first end and a second end and external threads on at least one of said ends;
    winding over said mandril and sleeve one or more layers of fiber and resin to make a winding of multiple cylinders which are integrally joined to one another, said first end defining an end section of one of said cylinders and said second end defining an end section of a different one of said cylinders;
    curing said resin after said winding step;
    removing said mandril from said, winding and said sleeve;
    cutting said winding in the area intermediate the ends of said sleeve so as to separate said cylinders; and
    removing said, sleeve from said, cylinders including the step of unscrewing said sleeve from at least one of said cylinders;
    wherein said step of inserting said mandril through said sleeve is performed so that said quill shaft is positioned between said mandril and said sleeve, said, step of winding over said mandril is performed by winding over said quill shaft in the area of said mandril covered by said quill shaft, and said quill shaft is removed from said cylinders after curing said resin.

8. A method as claimed in claim 7, further comprising the step of sliding over said mandril a bearing and performing said winding step over said bearing.

9. A method as claimed in claim 8, further comprising the step of sliding over said mandril a tube adjacent to a piston rod end of each said cylinder, cutting said cylinders apart in the area of said winding confronting said tube and removing said tube from said cylinders after said cylinders are cut apart.

10. A method as claimed in claim 9, further comprising the step of sliding over said mandril between each said bearing and the corresponding tube a seal cavity forming element, and removing said seal cavity forming elements from said cylinders after curing said resin.

* * * * *